US012366219B2

(12) United States Patent
Yokoyama

(10) Patent No.: US 12,366,219 B2
(45) Date of Patent: Jul. 22, 2025

(54) ENGINE CONTROLLER

(71) Applicant: SUBARU CORPORATION, Tokyo (JP)

(72) Inventor: Makoto Yokoyama, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 18/819,257

(22) Filed: Aug. 29, 2024

(65) Prior Publication Data

US 2025/0101937 A1 Mar. 27, 2025

(30) Foreign Application Priority Data

Sep. 25, 2023 (JP) ................................ 2023-159967

(51) Int. Cl.
*F02M 37/04* (2006.01)
*F02M 37/10* (2006.01)
*F02M 37/08* (2006.01)

(52) U.S. Cl.
CPC ..... *F02M 37/106* (2013.01); *F02M 2037/085* (2013.01)

(58) Field of Classification Search
CPC ............... F02M 37/106; F02M 37/025; F02M 37/0094; F02B 37/00; F02D 2250/18; F02D 41/3082; B60W 10/06; B60W 2510/0657; B60K 2015/0325; B60K 15/03
USPC .......................................................... 123/509
See application file for complete search history.

(56) References Cited

U.S. PATENT DOCUMENTS

2015/0275812 A1* 10/2015 Mori ..................... F02D 33/003 123/497
2015/0361936 A1* 12/2015 Honda ................. F02M 37/025 123/495
2017/0241351 A1* 8/2017 Kurotani ............... F02D 19/081
2020/0003166 A1* 1/2020 Porras .............. B60K 15/03177
2021/0231079 A1* 7/2021 Yamada .............. F02D 41/3845
2022/0090610 A1* 3/2022 Martin ...................... F04F 5/10

FOREIGN PATENT DOCUMENTS

JP 2016-053334 A 4/2016

* cited by examiner

*Primary Examiner* — Logan M Kraft
*Assistant Examiner* — James J Kim
(74) *Attorney, Agent, or Firm* — TROUTMAN PEPPER LOCKE LLP

(57) ABSTRACT

An engine controller includes a fuel supplier and one or more processors. The one or more processors determine, based on an operation state of an engine, whether an operation point of the engine is in an engine operation range where an amount of surplus fuel to be returned to a jet pump is smaller than a predetermined amount. Upon entry into the engine operation range, the one or more processors obtain an amount of remaining fuel in a sub-tank, based on a travel state of a vehicle, and accumulate an amount of fuel injection after the entry into the engine operation range, to obtain an accumulated amount of fuel injection. When the amount of remaining fuel in the sub-tank is smaller than the accumulated amount of fuel injection, the one or more processors put limitation on maximum torque for each engine speed of the engine.

5 Claims, 4 Drawing Sheets

ENGINE CONTROLLER

CROSS-REFERENCE TO RELATED APPLICATION

The present application claims priority from Japanese Patent Application No. 2023-159967 filed on Sep. 25, 2023, the entire contents of which are hereby incorporated by reference.

BACKGROUND

The disclosure relates to an engine controller.

Japanese Unexamined Patent Application Publication (JP-A) No. 2016-53334 discloses a fuel supply system including a fuel tank, a sub-tank, a fuel pump, a return pipe, and a jet pump. The fuel tank stores fuel. The sub-tank, or a swirl tank, is disposed in the fuel tank. The fuel pump is disposed in the sub-tank, boosts the fuel, and supplies the fuel to an engine. The return pipe returns, to the sub-tank, surplus fuel within the fuel supplied from the fuel pump. The jet pump is disposed on the return pipe and transfers the fuel stored in the fuel tank to the sub-tank by using a venturi effect by the surplus fuel to be returned to the sub-tank.

SUMMARY

An aspect of the disclosure provides an engine controller including a fuel supplier and one or more processors. The fuel supplier includes a fuel tank, a sub-tank, a fuel pump, a return pipe, and a jet pump. The fuel tank is configured to store fuel. The sub-tank is provided in the fuel tank. The fuel pump is provided in the sub-tank and configured to boost the fuel and supply the fuel to an engine of a vehicle. The return pipe is configured to return, to the sub-tank, surplus fuel within the fuel supplied from the fuel pump to the engine. The jet pump is disposed on the return pipe and configured to transfer the fuel stored in the fuel tank to the sub-tank by using a venturi effect by the surplus fuel to be returned to the sub-tank. The one or more processors are configured to control an amount of fuel injection and an amount of intake air of the engine. The one or more processors are configured to determine, based on an operation state of the engine, whether an operation point of the engine is in an engine operation range where an amount of the surplus fuel to be returned to the jet pump is smaller than a predetermined amount. Upon entry into the engine operation range where the amount of the surplus fuel to be returned to the jet pump is smaller than the predetermined amount, the one or more processors are configured to obtain an amount of remaining fuel in the sub-tank, based on a travel state of the vehicle. The one or more processors are configured to accumulate the amount of fuel injection after the entry into the engine operation range where the amount of the surplus fuel to be returned to the jet pump is smaller than the predetermined amount, to obtain an accumulated amount of fuel injection. When the amount of remaining fuel in the sub-tank is smaller than the accumulated amount of fuel injection, the one or more processors are configured to put limitation on maximum torque for each engine speed of the engine.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
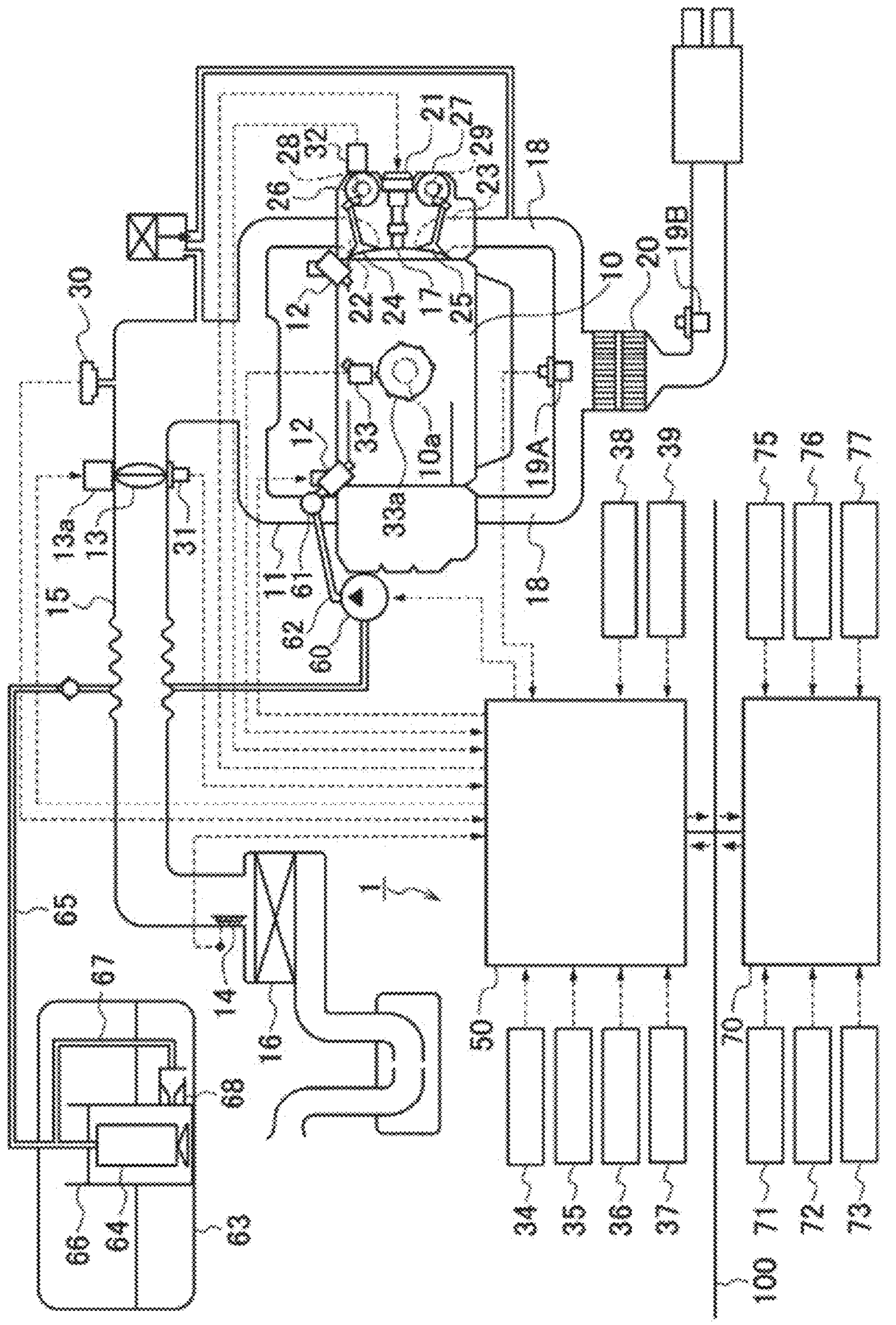
FIG. 1 is a configuration diagram of an engine controller according to an embodiment and a direct injection engine to which the engine controller is applied.

Depending on an operation state of an engine, an amount of fuel injection, i.e., an amount of fuel consumption, increases with respect to an amount of discharge from a fuel pump, i.e., an amount of fuel supply. For example, in a range where the amount of fuel injection increases, e.g., in a high-rotation high-load range, the amount of fuel injection increases with respect to the amount of discharge from the fuel pump. This causes a decrease in surplus fuel, i.e., an amount of return fuel. Accordingly, a jet pump becomes out of function, or lowers in its function, resulting in inhibition of fuel transfer to a sub-tank, or a decrease in an amount of fuel transfer. In such a state, continuing the operation of the engine, i.e., fuel consumption, contributes to a decrease in an amount of fuel in the sub-tank, i.e., an amount of remaining fuel.

Moreover, the amount of fuel in the sub-tank sometimes changes under influences of, for example, a travel state of a vehicle, e.g., a road surface gradient and an acceleration rate. When remaining fuel in the sub-tank is depleted or reduced, and the fuel pump fails in feeding fuel, there is possibility of lowered drivability because of, for example, a shortage in fuel supply despite that fuel remains in the fuel tank.

It is desirable to provide an engine controller that makes it possible to avoid lowered drivability because of depletion of, or reduction in, remaining fuel in the sub-tank despite that fuel remains in the fuel tank.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description.

First, with reference to FIG. 1, description is given of configurations of an engine controller 1 according to an embodiment and a direct injection engine 10 to which the engine controller 1 is applied. FIG. 1 is a configuration diagram of the engine controller 1 and the direct injection engine 10 to which the engine controller 1 is applied. In the following, the direct injection engine 10 is also simply referred to as an "engine 10".

The engine 10 may be, for example, a horizontally opposed four-cylinder gasoline engine. The engine 10 may be a direct injection engine configured to directly inject fuel into cylinders. In the engine 10, air sucked from an air cleaner 16 is throttled by an electronically controlled throttle valve 13 provided in an intake pipe 15, passes through an intake manifold 11, and is sucked into each cylinder provided in the engine 10. In the following, the electronically controlled throttle valve 13 is also simply referred to as a "throttle valve 13". An amount of air sucked from the air cleaner 16, i.e., an amount of air sucked into the engine 10, may be detected by an air flow meter 14 disposed between the air cleaner 16 and the throttle valve 13. A vacuum sensor 30 may be disposed inside a collector, i.e., a surge tank, that constitutes the intake manifold 11. The vacuum sensor 30 may detect pressure inside the intake manifold 11. Furthermore, the throttle valve 13 may include a throttle position sensor 31 configured to detect a throttle plate position of the throttle valve 13.

In a cylinder head, an intake port 22 and an exhaust port 23 may be provided for each cylinder. FIG. 1 illustrates only one bank. The intake port 22 and the exhaust port 23 may include an intake valve 24 and an exhaust valve 25, respectively. The intake valve 24 and the exhaust valve 25 may open and close the intake port 22 and the exhaust port 23, respectively. Between an intake camshaft 28 and an intake cam pulley, a variable valve timing mechanism 26 may be provided. The intake camshaft 28 may drive the intake valve 24. The variable valve timing mechanism 26 may cause relative rotational motion of the intake cam pulley and the intake camshaft 28 to continuously change a rotational phase, i.e., a displacement angle, of the intake camshaft 28 with respect to a crankshaft 10*a*, thereby advancing and retarding valve timing, i.e., opening and closing timing, of the intake valve 24. With the variable valve timing mechanism 26, the opening and closing timing of the intake valve 24 is variably set in accordance with an engine operation state.

Similarly, between an exhaust camshaft 29 and an exhaust cam pulley, a variable valve timing mechanism 27 may be provided. The variable valve timing mechanism 27 may cause relative rotational motion of the exhaust cam pulley and the exhaust camshaft 29 to continuously change a rotational phase, i.e., a displacement angle, of the exhaust camshaft 29 with respect to the crankshaft 10*a*, thereby advancing and retarding valve timing, i.e., opening and closing timing, of the exhaust valve 25. With the variable valve timing mechanism 27, the opening and closing timing of the exhaust valve 25 is variably set in accordance with the engine operation state.

To each cylinder of the engine 10, an injector 12 may be attached. The injector 12 may inject fuel into the cylinder. The injector 12 may directly inject fuel boosted by a high-pressure fuel pump 60 into a combustion chamber of each cylinder.

The injector 12 may be coupled to a delivery pipe 61, i.e., a common rail. The delivery pipe 61 may distribute fuel pumped from the high-pressure fuel pump 60 through a high-pressure fuel pipe 62 to each injector 12. The high-pressure fuel pump 60 may boost fuel to high pressure of, for example, 8 to 13 MPa in accordance with the operation state and supply the fuel to the delivery pipe 61. The fuel to be boosted by the high-pressure fuel pump 60 is sucked up from the fuel tank 63 by a feed pump 64, i.e., a low-pressure fuel pump, and supplied through a low-pressure fuel pipe 65. In this embodiment, the high-pressure fuel pump 60 may be driven by the intake camshaft 28 of the engine 10. In one embodiment of the disclosure, the feed pump 64 may serve as a "fuel pump".

In the fuel tank 63 that stores fuel, a sub-tank 66, i.e., a reservoir, may be provided. The sub-tank 66 may have, for example, a cylindrical shape. In the sub-tank 66, the feed pump 64 may be disposed. The feed pump 64 may be driven by an electric motor to boost the fuel and send or supply the fuel to the engine 10 or the injector 12.

To the low-pressure fuel pipe 65, a return pipe 67 may be coupled. The return pipe 67 may return surplus fuel to the sub-tank 66. The surplus fuel is surplus fuel within the fuel sent or supplied from the feed pump 64 to the engine 10 or the injector 12. On the return pipe 67, a jet pump 68 may be disposed. The jet pump 68 may transfer fuel stored in the fuel tank 63 to the sub-tank 66 by using a venturi effect by the surplus fuel to be returned to the sub-tank 66. In one embodiment of the disclosure, the sub-tank 66, the feed pump 64, the return pipe 67, and the jet pump 68 may serve as a "fuel supplier". The sub-tank 66, the feed pump 64, the return pipe 67, and the jet pump 68 may have known configurations.

To the cylinder head of each cylinder, a spark plug 17 and an igniter built-in coil 21 may be attached. The spark plug 17 may ignite an air-fuel mixture. The igniter built-in coil 21 may apply a high voltage to the spark plug 17. In each cylinder of the engine 10, the air-fuel mixture of the intake air and the fuel injected by the injector 12 is ignited by the spark plug 17 and combusted. An exhaust gas after the combustion is discharged through an exhaust pipe 18.

To the exhaust pipe 18, an air-fuel ratio sensor 19A may be attached. The air-fuel ratio sensor 19A may output a signal corresponding to an oxygen concentration in the exhaust gas. The air-fuel ratio sensor 19A may include a linear air-fuel ratio sensor (LAF sensor) configured to linearly detect an exhaust air-fuel ratio. Alternatively, the air-fuel ratio sensor 19A may include an $O_2$ sensor configured to detect the exhaust air-fuel ratio in an on-off manner.

Moreover, an exhaust gas purification catalyst (CAT) 20 may be disposed downstream of the air-fuel ratio sensor 19A. The exhaust gas purification catalyst 20 may include a three-way catalyst. The exhaust gas purification catalyst 20 is configured to simultaneously perform oxidization of hydrocarbon (HC) and carbon monoxide (CO) in the exhaust gas, and reduction of nitrogen oxides ($NO_x$) in the exhaust gas, to clean toxic gas components in the exhaust gas into harmless ones such as carbon dioxide ($CO_2$), water vapor ($H_2O$), and nitrogen ($N_2$). A rear (post-CAT) $O_2$ sensor 19B may be disposed downstream of the exhaust gas purification catalyst 20. The rear $O_2$ sensor 19B may detect the exhaust air-fuel ratio in the on-off manner.

In addition to the air flow meter 14, the air-fuel ratio sensor 19A, the rear $O_2$ sensor 19B, the vacuum sensor 30, and the throttle position sensor 31 described above, a cam angle sensor 32 may be attached to near the intake camshaft 28 of the engine 10. The cam angle sensor 32 may make a cylinder determination as to the engine 10. The cam angle sensor 32 may output an electric signal indicating a rotational position of the intake camshaft 28, and also output an electric signal indicating a rotational position of a pump driving cam of the high-pressure fuel pump 60 that rotates with the rotation of the intake camshaft 28.

A crank angle sensor 33 may be attached to near the crankshaft 10*a* of the engine 10. The crank angle sensor 33 may detect a rotational position of the crankshaft 10*a*. On an end of the crankshaft 10*a*, a timing rotor 33*a* may be attached. In the timing rotor 33*a*, thirty-four protrusions may be disposed at 10° intervals with two omissions. The crank angle sensor 33 may detect presence or absence of the protrusion of the timing rotor 33*a* to detect the rotational position of the crankshaft 10*a*. The cam angle sensor 32 and the crank angle sensor 33 may include, for example, electromagnetic pickup sensors.

These sensors may be coupled to an ECU 50. Moreover, to the ECU 50, various sensors may be coupled, e.g., a water temperature sensor 34, an oil temperature sensor 35, an amount-of-accelerator-operation sensor 36, and an intake air temperature sensor 37. The water temperature sensor 34 may detect a temperature of cooling water of the engine 10. The oil temperature sensor 35 may detect a temperature of a lubricating oil. The amount-of-accelerator-operation sensor 36 may detect an amount of stepping down of an accelerator pedal, that is, an amount of operation of the accelerator pedal. The intake air temperature sensor 37 may detect an intake air temperature. Furthermore, to the ECU 50, a fuel pressure sensor 38 and a fuel gauge 39 may be coupled. The fuel pressure sensor 38 may be attached to, for example, the delivery pipe 61 and detect pressure of the fuel to be supplied to the injector 12, i.e., fuel pressure boosted by the high-pressure fuel pump 60. The fuel gauge 39 may detect an amount of the fuel stored in a fuel tank 63, i.e., a fuel level. The fuel gauge 39 may include, for example, a float floated in the fuel tank 63 and an arm attached to the float, and may detect a position of the float, i.e., the amount of fuel, as a change in electric resistance. In an alternative, the fuel gauge 39 may include, for example, a capacitance sensor.

The ECU 50 may be communicatably coupled to, for example, a vehicle dynamics control unit 70 through, for example, a CAN (Controller Area Network) 100. In the following, the vehicle dynamics control unit 70 is also referred to as a "VDCU" 70.

To the VDCU 70, a brake switch 71 and a brake fluid pressure sensor 72 may be coupled. The brake switch 71 may detect whether a brake pedal is being stepped down. The brake fluid pressure sensor 72 may detect master cylinder pressure, i.e., brake hydraulic pressure, of a brake actuator. Moreover, to the VDCU 70, a wheel speed sensor 73 and a steering angle sensor 75 may be also coupled. The wheel speed sensor 73 may detect a rotational speed of each wheel of the vehicle, i.e., a vehicle speed. The steering angle sensor 75 may detect a rotation angle of a pinion shaft to detect a steering angle of front wheels as steering wheels, i.e., a steering wheel angle of a steering wheel. Furthermore, to the VDCU 70, for example, a longitudinal acceleration rate sensor 76 and a lateral acceleration rate sensor 77 may be coupled. The longitudinal acceleration rate sensor 76 may detect a longitudinal acceleration rate acting on the vehicle. The lateral acceleration rate sensor 77 may detect a lateral acceleration rate, or a vehicle-widthwise acceleration rate, acting on the vehicle.

Here, for example, a road surface gradient may be detected based on a difference between a corrected acceleration rate sensor value and a differential value of the vehicle speed. The corrected acceleration rate sensor value may be obtained by adding a zero-point learning value to the longitudinal acceleration rate of the vehicle detected by using the longitudinal acceleration rate sensor 76. Alternatively, the road surface gradient may be estimated based on a driving force, a vehicle acceleration rate, and a vehicle weight. The driving force may be obtained from output torque of the engine 10. The vehicle acceleration rate may be obtained from the differential value of the vehicle speed. The vehicle weight may be set in advance.

The VDCU 70 may drive the brake actuator in accordance with an amount of operation of the brake pedal, i.e., an amount of stepping down of the brake pedal, to brake the vehicle. The VDCU 70 may also detect vehicle behavior by the various sensors such as the wheel speed sensor 73, the steering angle sensor 75, the longitudinal acceleration rate sensor 76, the lateral acceleration rate sensor 77, and a yaw rate sensor, and suppress a lateral slip by a brake control by automatic pressurization and a torque control of the engine 10, to ensure vehicle stability when the vehicle is cornering.

The VDCU 70 may transmit, for example, braking data, i.e., braking operation data, the wheel speed, i.e., the vehicle speed, the longitudinal acceleration rate, the lateral acceleration rate, and the road surface gradient, to the ECU 50 through the CAN 100. The braking data may include, for example, a detection result by the brake switch 71 and brake fluid pressure.

The ECU 50 may include a microprocessor, an EEPROM, a RAM, a backup RAM, and an input output interface (I/F). The microprocessor may perform calculation. The EEPROM may hold, for example, programs that cause the microprocessor to carry out each process. The RAM may hold various kinds of data such as calculation results. Contents of storage of the backup RAM may be maintained by a 12 V battery. The ECU 50 may further include, for example, an injector driver, an output circuit, and a motor driver. The injector driver may drive the injector 12. The output circuit may output an ignition signal. The motor driver may drive an electric motor 13*a* that opens and closes the electronically controlled throttle valve 13. The ECU 50 may also include, for example, a driver that drives a solenoid valve constituting the high-pressure fuel-pump 60.

In the ECU 50, the cylinder determination may be made based on an output of the cam angle sensor 32, and the engine speed may be obtained based on an output of the crank angle sensor 33. Moreover, in the ECU 50, various kinds of data may be acquired based on the detection signals inputted from the various sensors described above. The various kinds of data may include, for example, an amount of intake air, intake pipe negative pressure, the amount of operation of the accelerator pedal, an air-fuel ratio of the air-fuel mixture, the intake air temperature, and the water temperature and the oil temperature of the engine 10. Furthermore, the ECU 50 may receive, for example, the braking data, i.e., the braking operation data, the wheel speed, i.e., the vehicle speed, the longitudinal acceleration rate, the lateral acceleration rate, and the road surface gradient through the CAN 100. The braking data may include, for example, the detection result by the brake switch 71 and the brake fluid pressure.

Thus, based on the various kinds of data thus acquired, the ECU 50 may control an amount of fuel injection, fuel injection timing, ignition timing, and various devices such as the throttle valve 13, or the amount of intake air, to make a comprehensive control of the engine 10. In one embodiment of the disclosure, the ECU 50 may serve as "one or more processors".

In one example, the ECU 50 is configured to avoid lowered drivability because of depletion of, or reduction in, the remaining fuel in the sub-tank 66 despite that the fuel remains in the fuel tank 63. The ECU 50 is configured to avoid the lowered drivability mentioned above by the microprocessor executing the program held in, for example, the EEPROM.

First, the ECU 50 may determine, based on the operation state of the engine 10, whether an operation point of the engine 10 is in an engine operation range where an amount of return fuel, i.e., an amount of surplus fuel to be returned to the jet pump 68, is smaller than a predetermined amount, and the jet pump 68 may possibly become out of function. In the following, such an engine operation range is referred to as a "burnout operation range". That is, the ECU 50 may determine whether the operation point of the engine 10 is in an operation range where: the amount of fuel injection, i.e., an amount of consumption, is large with respect to an amount of discharge from the fuel pump, i.e., an amount of supply; the amount of return fuel, i.e., the amount of surplus fuel, decreases; the venturi effect of the jet pump 68 lowers, i.e., the jet pump 68 lowers in its function; and fuel transfer to the sub-tank 66 is inhibited, or an amount of fuel transfer becomes smaller than the amount of consumption.

In one example, the ECU 50 may determine whether the operation point of the engine 10 is in the burnout operation range, based on the engine speed and the amount of intake air, i.e., a load or supercharging pressure, or based on the engine speed and the amount of fuel injection, i.e., fuel injection time. The burnout operation range is the engine operation range where the amount of surplus fuel to be returned to the jet pump 68, i.e., the amount of return fuel, is smaller than the predetermined amount, and the jet pump 68 may possibly become out of function.

Figure 2:
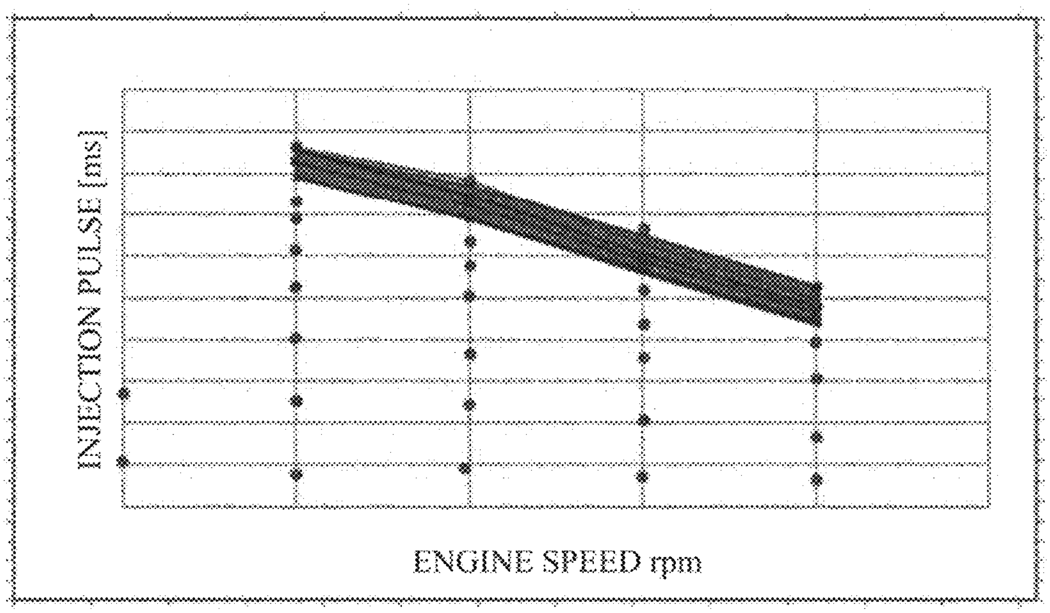
FIG. 2 is a diagram of an example of a map of an engine operation range where surplus fuel, or fuel to be returned to a jet pump, is possibly insufficient.

FIG. 2 illustrates an example of a map indicating the operation range of the engine 10 in which the surplus fuel, i.e., the fuel to be returned to the jet pump 68, is possibly insufficient. In FIG. 2, the horizontal axis represents the engine speed (rpm), and the vertical axis represents a fuel injection pulse-width (ms) to be applied to the injector 12, that is, valve opening time of the injector 12 when the fuel injection time is proportional to the amount of fuel injection. As illustrated in FIG. 2, in the operation range where the amount of fuel injection, i.e., the amount of consumption, increases, e.g., in a high-rotation high-load range, the amount of fuel injection, i.e., the amount of consumption, increases with respect to the amount of discharge from the fuel pump, i.e., the amount of supply. Thus, the amount of return fuel, i.e., the amount of surplus fuel decreases, and the jet pump 68 becomes out of function or lowers in its function. This may possibly inhibit the fuel transfer to the sub-tank 66 or cause a decrease in the amount of transfer.

Thereafter, upon entry into the burnout operation range, the ECU 50 may obtain the amount of remaining fuel in the sub-tank 66 upon the entry into the burnout operation range, based on a travel state of the vehicle. The burnout operation range is the engine operation range where the amount of surplus fuel to be returned to the jet pump 68, i.e., the amount of return fuel, is smaller than the predetermined amount.

Figure 3:
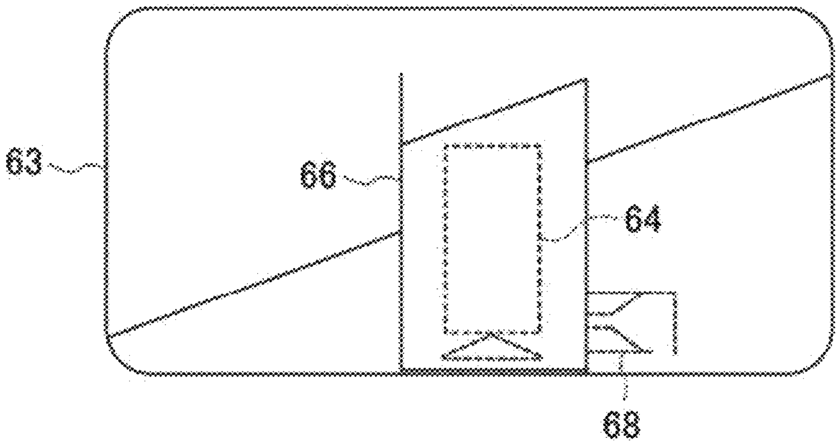
FIG. 3 is a diagram of relation between a vehicle acceleration rate and an amount of fuel in a sub-tank, or an inclination of a liquid level.

FIG. 3 illustrates relation between the vehicle acceleration rate and the amount of fuel in the sub-tank 66, i.e., an inclination of a liquid level. For example, in FIG. 3, when the vehicle accelerates leftward, e.g., frontward, the fuel is shifted rightward, e.g., rearward. Thus, the liquid level of the fuel is inclined to become higher as goes rightward. Depending on magnitude of the acceleration rate, the fuel overflows from an edge of the sub-tank 66.

Thus, upon the entry into the burnout operation range, the ECU 50 may obtain the amount of remaining fuel in the sub-tank 66 based on the road surface gradient of the road surface traveled by the vehicle, and the vehicle acceleration rate. At this occasion, the ECU 50 may obtain the amount of remaining fuel in the sub-tank 66 by using, for example, a map that defines relation between the road surface gradient, the vehicle acceleration rate, and an angle of the liquid level of the fuel in the sub-tank 66.

Moreover, the ECU 50 may accumulate the amount of fuel injection, i.e., the amount of consumption, after the entry into the burnout operation range, to obtain an accumulated amount of fuel injection, i.e., an accumulated amount of consumption. The burnout operation range is the engine operation range where the amount of surplus fuel to be returned to the jet pump 68, i.e., the amount of return fuel, is smaller than the predetermined amount.

In one example, the ECU 50 may set the amount of fuel injection based on the operation state of the engine 10, and add a current value of the amount of fuel injection, i.e., a current value of the amount of consumption, to a previous value of the accumulated amount of fuel injection, i.e., a previous value of the accumulated amount of consumption, to calculate a current value of the accumulated amount of fuel injection. The amount of fuel injection Ginj to be injected by the injector 12, i.e., the valve opening time of the injector 12 for the fuel injection, is determined by the following expression (1).

$$Ginj = GF \times \alpha + \beta \tag{1}$$

In the expression, GF denotes a basic amount of fuel injection to be set based on the amount of intake air and the engine speed. The ECU 50, e.g., the EEPROM, may hold a map that defines relation between the amount of intake air, the engine speed, and the basic amount of fuel injection GF, i.e., a map of the basic amount of fuel injection. By correcting the basic amount of fuel injection GF with various correction coefficients $\alpha$ and $\beta$, the final amount of fuel injection Ginj may be determined.

When the amount of remaining fuel in the sub-tank 66 is smaller than the accumulated amount of fuel injection, i.e., the accumulated amount of consumption, the ECU 50 puts limitation on maximum torque for each engine speed of the engine 10. In one example, the ECU 50 may control the throttle valve 13 closewise, for example. In other words, the ECU 50 may allow the operation point of the engine 10 to exit from the burnout operation range, i.e., the operation range where the amount of return fuel is possibly insufficient. With such limitation on the torque, i.e., a shift of the operation point, the amount of fuel injection decreases. This causes an increase in the amount of surplus fuel to be returned to the jet pump 68, leading to restoration of the function of the jet pump 68, i.e., the venturi effect.

After exit from the burnout operating range, the ECU 50 may obtain the amount of fuel transfer from the fuel tank 63 to the sub-tank 66 by the jet pump 68, based on the amount of return fuel, i.e., the amount of surplus fuel, obtained in accordance with the operation state of the engine 10. The ECU 50 may also accumulate the amount of fuel transfer from the fuel tank 63 to the sub-tank 66 by the jet pump 68, to obtain an accumulated amount of fuel transfer. The burnout operating range is the engine operation range where the amount of surplus fuel to be returned to the jet pump 68, i.e., the amount of return fuel, is smaller than the predetermined amount, and the jet pump 68 may possibly become out of function. The amount of fuel transfer from the fuel tank 63 to the sub-tank 66 by the jet pump 68 includes the amount of return fuel. The operation state of the engine 10 includes, for example, the engine speed and the amount of intake air. The amount of return fuel may be obtained by using, for example, the map of the amount of return fuel, and the various correction coefficients α and β described above. The map of the amount of return fuel defines the relation between the engine speed, the amount of intake air, and the amount of return fuel.

When the accumulated amount of fuel transfer is equal to or larger than a predetermined amount, the ECU 50 may release a torque guard, i.e., the limitation on the maximum torque for each engine speed of the engine 10. That is, the ECU 50 may restore the normal control. The predetermined amount may be set in consideration of capacity of the sub-tank 66. Thus, the ECU 50 may release the limitation on the maximum torque of the engine 10 when the amount of fuel in the sub-tank 66 is restored.

Figure 4:
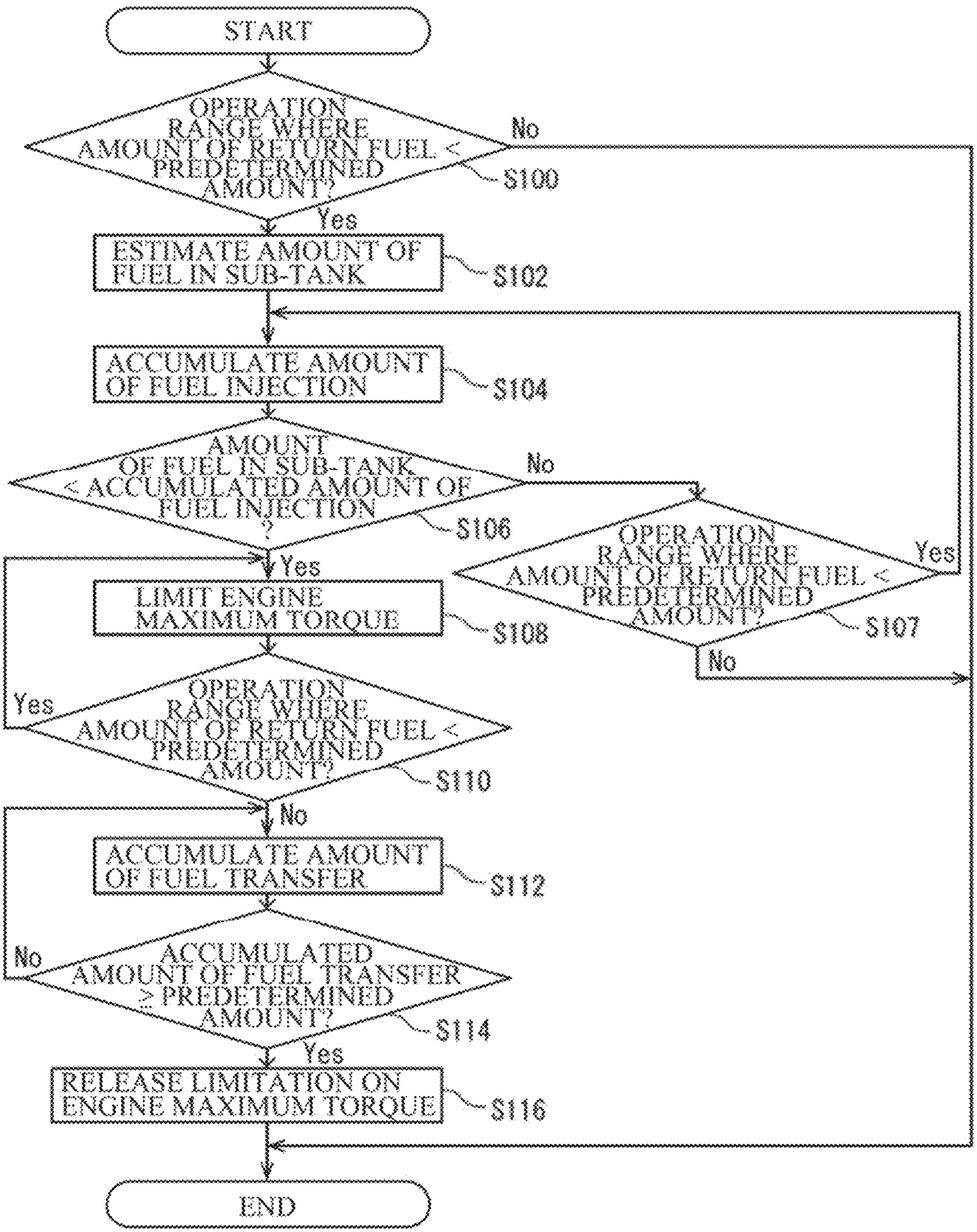
FIG. 4 is a flowchart of a procedure of maximum torque limitation processing by the engine controller according to the embodiment.

Description is given next, with reference to FIG. 4, of operation of the engine controller 1. FIG. 4 is a flowchart of a procedure of maximum torque limitation processing by the engine controller 1. This processing may be repeatedly carried out in, for example, the ECU 50 at predetermined timing.

In step S100, based on the operation state of the engine 10, the determination may be made as to whether the operation point of the engine 10 is in the burnout operation range, i.e., the engine operation range where the amount of surplus fuel to be returned to the jet pump 68, i.e., the amount of return fuel, is smaller than the predetermined amount, and the jet pump 68 may possibly become out of function. The operation state of the engine 10 may include the engine speed and the amount of intake air, or alternatively, the operation state of the engine 10 may include the engine speed and the amount of fuel injection or the fuel injection time. When the operation point of the engine 10 is not in the burnout operation range (No in step S100), the flow may be ended for the moment. When the operation point of the engine 10 is in the burnout operation range (Yes in step S100), the flow may be caused to proceed to step S102. The method of determining whether the operation point of the engine 10 is in the burnout operation range is as described above, and detailed description thereof is omitted.

Upon the entry into the burnout operation range, in step S102, the amount of remaining fuel in the sub-tank 66 may be obtained based on the travel state of the vehicle. The travel state of the vehicle may include the road surface gradient and the vehicle acceleration rate. The method of obtaining the amount of remaining fuel in the sub-tank 66 is as described above, and detailed description thereof is omitted.

Thereafter, in step S104, the amount of fuel injection, i.e., the amount of consumption, after the entry into the burnout operation range may be accumulated to obtain the accumulated amount of fuel injection, i.e., the accumulated amount of consumption. The method of obtaining the accumulated amount of fuel injection is as described above, and detailed description thereof is omitted.

Thereafter, in step S106, the determination may be made as to whether the amount of remaining fuel in the sub-tank 66 is smaller than the accumulated amount of fuel injection. When the amount of remaining fuel in the sub-tank 66 is smaller than the accumulated amount of fuel injection (Yes in step S106), the flow may be caused to proceed to step S108. When the amount of remaining fuel in the sub-tank 66 is not smaller than the accumulated amount of fuel injection (No in step S106), the flow may be caused to proceed to step S107.

In step S107, the determination may be made as to whether the operation point of the engine 10 is in the burnout operation range. When the operation point of the engine 10 is not in the burnout operation range (No in step S107), the flow may be ended for the moment. When the operation point of the engine 10 is in the burnout operation range (Yes in step S107), the flow may be caused to proceed to step S104, and the processes of steps S104 to S106 described above may be carried out again or repeatedly.

In step S108, the limitation may be put on the maximum torque for each engine speed of the engine 10. For example, the throttle valve 13 is driven closewise, to reduce the amount of intake air.

Thereafter, in step S110, the determination may be made as to whether the operation point of the engine 10 has exited from the burnout operation range, i.e., the engine operation range where the amount of surplus fuel to be returned to the jet pump 68, i.e., the amount of return fuel, is smaller than the predetermined amount, and the jet pump 68 may possibly become out of function. When the operation point of the engine 10 has not exited from the burnout operation range (No in step S110), the flow may be caused to proceed to step S108, and the processes of steps S108 to S110 described above may be carried out again or repeatedly. When the operation point of the engine 10 has exited from the burnout operation range (Yes in step S110), the flow may be caused to proceed to step S112.

In step S112, based on the amount of return fuel, i.e., the amount of surplus fuel, obtained in accordance with the operation state of the engine 10, the amount of fuel transfer from the fuel tank 63 to the sub-tank 66 by the jet pump 68 may be obtained. The amount of fuel transfer from the fuel tank 63 to the sub-tank 66 by the jet pump 68 may be accumulated to obtain the accumulated amount of fuel transfer. The amount of fuel transfer from the fuel tank 63 to the sub-tank 66 by the jet pump 68 includes the amount of return fuel.

Thereafter, in step S114, the determination may be made as to whether the accumulated amount of fuel transfer is equal to or larger than the predetermined amount. When the accumulated amount of fuel transfer is not equal to or larger than the predetermined amount (No in step S114), the flow may be caused to proceed to step S112, and the processes of steps S112 to S114 described above may be carried out again or repeatedly. When the accumulated amount of fuel transfer is equal to or larger than the predetermined amount (Yes in step S114), the flow may be caused to proceed to step S116.

In step S116, the limitation on the maximum torque for each engine speed of the engine 10, i.e., the torque guard, may be released. That is, the normal control is restored. Thereafter, the flow may be ended.

As described above in detail, according to this embodiment, based on the operation state of the engine 10, the determination may be made as to whether the operation point of the engine 10 is in the burnout operation range, i.e., the engine operation range where the amount of surplus fuel to be returned to the jet pump 68 is smaller than the predetermined amount. Upon the entry into the burnout operation range, the amount of remaining fuel in the sub-tank 66 may be obtained based on the travel state of the vehicle. The amount of fuel injection after the entry into the burnout operation range may be accumulated to obtain the accumulated amount of fuel injection. When the amount of remaining fuel in the sub-tank 66 is smaller than the accumulated amount of fuel injection, the limitation may be put on the maximum torque for each engine speed of the engine 10. Thus, the amount of fuel injection decreases with the limitation on the torque, and the operation point shifts, causing the increase in the amount of surplus fuel to be returned to the jet pump 68. This results in the restoration of the function of the jet pump 68, i.e., the venturi effect, causing the fuel transfer to the sub-tank 66. Hence, it is possible to avoid lowered drivability because of, for example, a shortage of fuel supply.

As a result, in this embodiment, it is possible to avoid the lowered drivability because of the depletion of, or the reduction in, the remaining fuel in the sub-tank 66 despite that the fuel remains in the fuel tank 63.

At this occasion, in this embodiment, it is possible to appropriately determine whether the operation point of the engine 10 is in the burnout operation range, based on the engine speed and the amount of intake air, or based on the engine speed and the amount of fuel injection or the fuel injection time. The burnout operation range is the engine operation range where the amount of surplus fuel to be returned to the jet pump 68, i.e., the amount of return fuel, is smaller than the predetermined amount, in other words, the jet pump 68 may possibly become out of function. The amount of intake air may be the load or the supercharging pressure.

Moreover, in this embodiment, it is possible to appropriately obtain the amount of remaining fuel in the sub-tank 66 based on the road surface gradient upon the entry into the burnout operation range and the vehicle acceleration rate. The road surface gradient is the gradient of the road surface traveled by the vehicle.

Furthermore, in this embodiment, the current value of the amount of fuel injection may be added to the previous value of the accumulated amount of fuel injection, to calculate the current value of the accumulated amount of fuel injection. Hence, it is possible to appropriately obtain the accumulated amount of fuel injection, i.e., the accumulated amount of consumption, after the entry into the burnout operation range.

In this embodiment, after the exit from the burnout operation range, the amount of fuel transfer from the fuel tank 63 to the sub-tank 66 by the jet pump 68 may be obtained based on the amount of return fuel, i.e., the amount of surplus fuel, obtained in accordance with the operation state of the engine 10. The amount of fuel transfer from the fuel tank 63 to the sub-tank 66 by the jet pump 68 includes the amount of return fuel. The amount of fuel transfer from the fuel tank 63 to the sub-tank 66 by the jet pump 68 may be accumulated to obtain the accumulated amount of fuel transfer. When the accumulated amount of fuel transfer is equal to or larger than the predetermined amount, the limitation on the maximum torque of the engine 10 may be released. Hence, it is possible to appropriately release, or end, the limitation on the maximum torque for each engine speed when the amount of fuel in the sub-tank 66 is restored.

Although some example embodiments of the disclosure have been described in the foregoing by way of example with reference to the accompanying drawings, the disclosure is by no means limited to the embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof.

For example, in the forgoing embodiment, the direct injection engine is described as an example of the engine 10, but the engine 10 may be a port injection engine. Moreover, the engine 10 may use a combination of an injector for direct injection and an injector for port injection. Furthermore, in the forgoing embodiment, a natural aspirated (NA) engine is described as an example of the engine 10, but the engine 10 may be an engine including a supercharger such as a turbocharger.

In addition, in the forgoing embodiment, the disclosure is applied to an existing engine vehicle, but the disclosure may also be applied to, for example, an engine of a hybrid electric vehicle (HEV).

Moreover, system configurations of the control units such as the ECU 50 and the VDCU 70, and functions to be allotted to the control units are not limited to the forgoing embodiments. For example, in the forgoing embodiment, the longitudinal acceleration rate sensor 76, the lateral acceleration rate sensor 77, and the like are coupled to the VDCU 70, and the longitudinal acceleration rate and the lateral acceleration rate thus read are transmitted to the ECU 50 through the CAN 100. However, the longitudinal acceleration rate sensor 76, the lateral acceleration rate sensor 77, and the like may be directly coupled to the ECU 50, and the longitudinal acceleration rate and the lateral acceleration rate may be directly inputted to the ECU 50. Furthermore, the ECU 50 and the VDCU 70 may be constituted by integrated hardware.

In addition, the forgoing control, i.e., the maximum torque limitation processing, may be carried out when the amount of fuel, i.e., the fuel level, in the fuel tank 63 is smaller than a predetermined amount, that is, when the liquid level of the fuel is equal to or lower than a height of the sub-tank 66.

The ECU 50 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the ECU 50. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the ECU 50 illustrated in FIG. 1.

The invention claimed is:

1. An engine controller comprising a fuel supplier, and one or more processors, the fuel supplier comprising:

- a fuel tank configured to store fuel;
- a sub-tank provided in the fuel tank;
- a fuel pump provided in the sub-tank and configured to boost the fuel and supply the fuel to an engine of a vehicle;
- a return pipe configured to return, to the sub-tank, surplus fuel within the fuel supplied from the fuel pump to the engine; and
- a jet pump disposed on the return pipe and configured to transfer the fuel stored in the fuel tank to the sub-tank by using a venturi effect by the surplus fuel to be returned to the sub-tank, the one or more processors being configured to control an amount of fuel injection and an amount of intake air of the engine, wherein the one or more processors are configured to determine, based on an operation state of the engine, whether an operation point of the engine is in an engine operation range where an amount of the surplus fuel to be returned to the jet pump is smaller than a predetermined amount, upon entry into the engine operation range where the amount of the surplus fuel to be returned to the jet pump is smaller than the predetermined amount, obtain an amount of remaining fuel in the sub-tank, based on a travel state of the vehicle, accumulate the amount of fuel injection after the entry into the engine operation range where the amount of the surplus fuel to be returned to the jet pump is smaller than the predetermined amount, to obtain an accumulated amount of fuel injection, and when the amount of remaining fuel in the sub-tank is smaller than the accumulated amount of fuel injection, put limitation on maximum torque for each engine speed of the engine.

2. The engine controller according to claim 1, wherein the one or more processors are configured to determine whether the operation point of the engine is in the engine operation range where the amount of the surplus fuel to be returned to the jet pump is smaller than the predetermined amount, based on the engine speed and the amount of intake air, or based on the engine speed and the amount of fuel injection.

3. The engine controller according to claim 2, wherein the one or more processors are configured to, upon the entry into the engine operation range where the amount of the surplus fuel to be returned to the jet pump is smaller than the predetermined amount, obtain the amount of remaining fuel in the sub-tank based on a gradient of a road surface traveled by the vehicle, and an acceleration rate of the vehicle.

4. The engine controller according to claim 3, wherein the one or more processors are configured to set the amount of fuel injection based on the operation state of the engine, and add a current value of the amount of fuel injection to a previous value of the accumulated amount of fuel injection, to calculate a current value of the accumulated amount of fuel injection.

5. The engine controller according to claim 4, wherein the one or more processors are configured to, after exit from the engine operation range where the amount of the surplus fuel to be returned to the jet pump is smaller than the predetermined amount, obtain an amount of fuel transfer by the jet pump from the fuel tank to the sub-tank, and accumulate the amount of fuel transfer to obtain an accumulated amount of fuel transfer, and release the limitation on the maximum torque for each engine speed of the engine when the accumulated amount of fuel transfer is larger than a predetermined amount.

* * * * *